Aug. 22, 1939.  G. T. BALFE  2,170,363
GASKET
Filed March 4, 1935
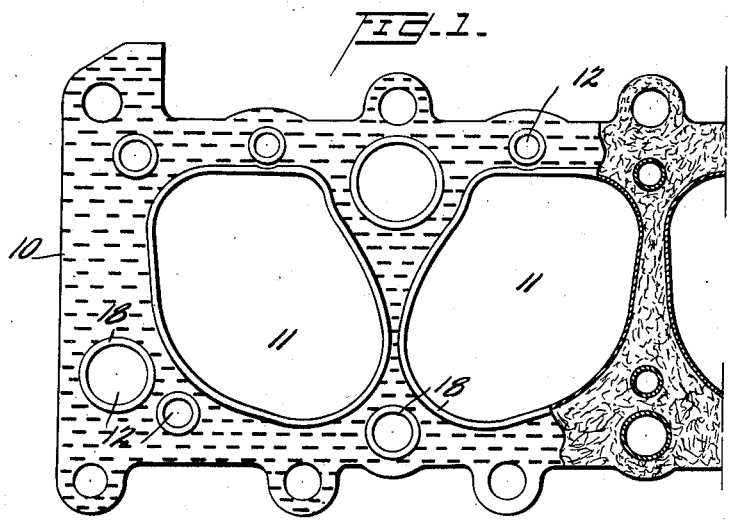
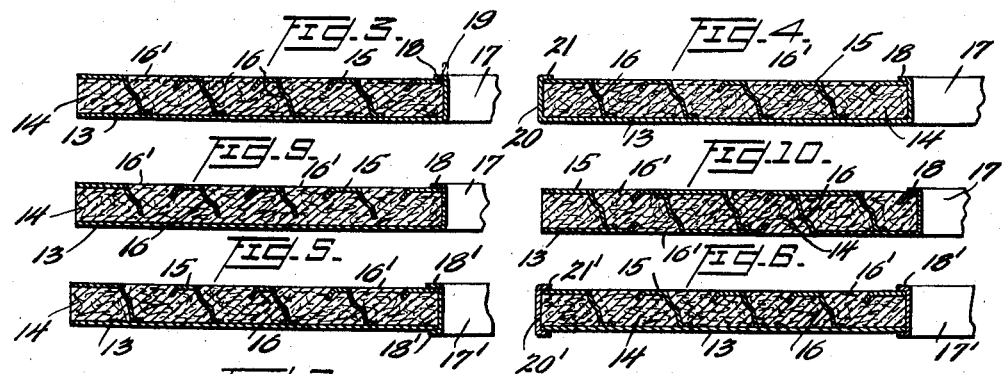
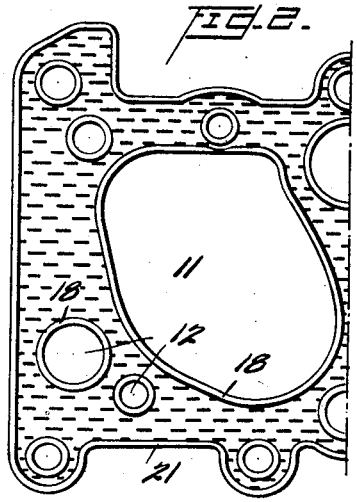
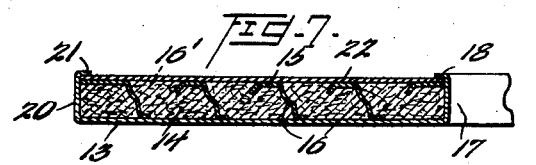
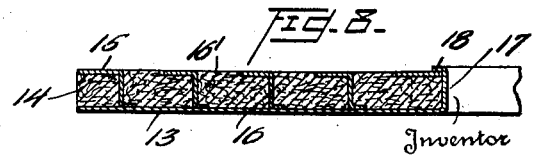
Inventor
George T. Balfe
By Cushman, Darby, & Cushman
Attorneys Patented Aug. 22, 1939

2,170,363

UNITED STATES PATENT OFFICE 2,170,363

GASKET

George T. Balfe, Detroit, Mich., assignor to Detroit Gasket & Mfg. Co., Detroit, Mich., a corporation of Michigan Application March 4, 1935, Serial No. 9,311

1 Claim. (Cl. 288—26)

This invention relates to packings and particularly gaskets for use in automotive practice.

One of the objects of the invention is to provide a flexible and resilient packing which will have marked resistant properties (1) to blowing (2) to the action of heat and cold, i. e., temperature variations, (3) high pressures, and (4) which will not be effected by chemical action or moisture.

The invention comprises a plurality of metal facings between which is interposed a layer of suitable cushion material. Embedded in the cushion material and extending throughout the thickness thereof, i. e., substantially from one facing to the other and substantially throughout the area of the gasket are a plurality of metal barriers. These barriers are in closely spaced relation and are preferably struck from the metal forming one of the facings so that the cushion layer is additionally anchored thereto. In this manner a substantially blow-proof gasket is produced since the cushion material substantially throughout its area is sustained by the barriers or projections, but should a break or blow occur at any point, widening or continuation of the breach will be effectively resisted and further tearing of the gasket prevented. This high resistance is made all the more positive by rendering the cushion layer, temperature and moisture resistant, and anchoring it to the facing by means of the barriers.

The seal is thoroughly effective, for example, as a cylinder head gasket, as a carburetor gasket and, in fact, for all automotive purposes and such other applications where a gasket capable of resisting the most strenuous conditions is required.

The invention further comprehends a method of manufacture whereby laminated packing material and gaskets are cheaply and efficiently made; since gaskets are produced in tremendous quantity, the advantages of the method of the present invention, whereby a saving in cost is obtained, will be understood.

Referring to the drawing:

Figure 1 is a top elevation partly broken away.

Figure 2 is a top elevation of a modification.

Figure 3 is an enlarged sectional view taken on the line 2—2 of Figure 1.

Figure 4 is an enlarged sectional view taken on the line 4—4 of Figure 2.

Figure 5 is an enlarged sectional view of a modification taken on the line 5—5 of Figure 1.

Figure 6 is an enlarged sectional view taken on the line 6—6 of Figure 2.

Figure 7 is a sectional view of a modification.

Figure 8 is another sectional view of a modification.

Figure 9 is another sectional view of a modification.

Figure 10 is another sectional view of a modification, and

Figure 11 is a detail view partly broken away of one of the gromets employed in my invention.

Referring to Figure 1, I have illustrated by way of example a cylinder head gasket as a whole at 10 having the usual port openings 11 and water and bolt openings 12. The gasket may have any desired shape, size or thickness for the particular joint surfaces between which it is to be interposed and form a seal.

Referring to Figure 3, the gasket comprises two coextensive metal facing layers 13 preferably of thin resilient and flexible steel. Between these layers is interposed a coextensive layer of cushion material 14 preferably of asbestos treated to be temperature, moisture and chemical resistant, i.e., resistant to the very arduous conditions prevailing about an internal combustion engine, such as the action of high temperatures, water and gases. The asbestos is treated in accordance with my Patent 1,788,041 and my pending United States application Serial No. 648,691, filed December 22, 1932, now Patent No. 2,055,471, issued September 29, 1936. That is to say, there is incorporated in the asbestos layer either with the fibers, before or during fabrication of the sheet, or by suitably impregnating or coating the sheets, a waterproofing adhesive of the order of oleates, rubber mixtures, sterates, resinates, asphalts and bitumens. In fact, any suitable waterproofing material having the adhesive qualities of these substances and which will withstand the heat and pressure and the action of gases and moisture characteristic of the conditions surrounding the use of a gasket, may be employed. It is important that the amount of waterproof adhesive in the final sheet material be regulated. While not necessary, in some cases, the facing layers on the inner and/or exposed surfaces are provided with a non-sticking layer, for example, of some powdered material such as graphite, over which is applied a non-sticking binding layer such as silicate of soda all as set forth in my application Serial No. 648,691. This use of a powdered non-sticking layer and a binding skin may likewise be applied to one or both surfaces of the layer of waterproofed cushion material 14, as well as to the metal facing layers or to both, as desired.

Preferably one of the facing layers 15 (or both as shown in Figure 10) is provided throughout its area with a multiplicity of up-struck projections 16 as in my United States Patent 1,776,140 or as shown in my United States Patent 1,927,450. These projections are struck-up on one side only of the metal facing layer 15 and are embedded in the cushion layer 14 by pressure. Preferably the projections extend through the cushion layer to the surface thereof and have their ends bent over or clinched to lie within the plane of the cushion material layer so as to form a smooth unobstructed surface. On the other hand, in some cases, the ends of the projections will terminate short of the exposed surface of the cushion material layer as shown in Figure 9.

It will be observed then upon reference to Figures 3, 4, 5, 6, 7 and 8, that the projections 16, which are formed in closely spaced relation substantially throughout the area of the gasket, provide metal barriers extending substantially across the thickness of the gasket, i. e., the cushion layer, from one facing to the other. In this manner, a continuous series of barriers are produced which are substantially completely resistant to the effects of heat and pressure such as sometimes blow the ordinary copper asbestos gasket. What is more important, should a break or blow occur, its extension or continuation is effectively stopped by the action of the multitude of closely spaced barriers 16 about the break which, in combination with the treated asbestos, effectively prevent any widening of the breach.

In the manufacture of the gasket a unit 14—15 is preferably formed comprising a metal layer 15 having the projections 16 struck-up on one side thereof and the cushion layer 14 is then united to that side by pressure, preferably bringing the projections to the surface of the cushion material and clinching over the ends thereof to lie within the plane of the surface of the cushion material so that a smooth surface is formed. This unit is superposed upon the coextensive metal facing layer 13 and joined thereto by integral gromets as shown in Figure 3 or separate gromets as shown in Figures 5, 6 and 11, or by metal stitching or an adhesive.

In Figure 3, the facing layers and cushion material are united by means of a substantially circular gromet 17 formed integral with the facing layer 13 by drawing the metal thereof at the desired points upwardly and bending over the edge 18 thereof upon the exposed surface of the opposed facing 15. Thus, in forming the gasket, as many integral gromets 17, as desired, are drawn from the metal facing corresponding to the gasket openings and with the edge portions 18 extending vertically as shown in dotted lines in Figure 3. Thereupon, the preformed unit 14—15 provided with gasket openings is superposed upon the facing 13 with the gromet or gromets extending through the corresponding openings in the unit 14—15. Then, by means of pressure the edge or flange 18 of the gromet 17 is turned over and compressed as shown in Figure 3, for example, and also as shown in Figure 1. In this manner, the respective layers are brought into registered relation and clamped together firmly into a final gasket unit and, moreover, the gromet 17 forms a reinforcement and seal for the internal exposed edges of the gasket openings. Again, the edge portion or flange 18 which is compressed down upon the facing 15 provides an additional layer of metal at the gasket opening, so as to reinforce the perforate layer 15 and additionally increase its resistance to blowing.

In the drawing, the compressed edge portion 18 is shown as extending above the plane of the metal facing 15. This is somewhat exaggerated, since the compression densifies and compresses the cushion material 14 and the adjacent, i. e., underlying, edge portions 19 of the facing are indented, so that the edge 18 of the gromet will lie substantially flush with the remainder of the surface of the facing to form a smooth continuous surface. This is not in some cases entirely essential, but is desirable.

Referring to Figure 3, it will be observed that the striking-up of the barriers 16 results in a number of perforations 16' being formed in the facing 15. When the cushion material is compressed upon the facing 15, it substantially completely fills the openings or perforations 16' so that a substantially smooth continuous surface is presented and such openings are effectively sealed. When the gasket is compressed by the joint surfaces, the cushion material is further compressed into the openings 16' and densified therein, so that the gasket is thoroughly leakproof. This presence of the cushion material at the surface of the gasket also adds to the flexibility and compressibility of the gasket.

Referring to Figure 9, I have illustrated a gasket wherein the barriers 16 are only partially embedded in the cushion layer 14, that is, do not extend initially to the opposite surface of the cushion layer as in the other gaskets. When the gasket of Figure 9 is applied to the joint surfaces and compressed therebetween, the compression will serve to further embed the barriers or projections in the cushion material, so that they assume a position extending substantially across the thickness of the gasket from one facing to the other as illustrated in Figure 3. It will be understood, therefore, that the gaskets of Figures 1 to 10 will be initially constructed (1) as shown, for example, in Figure 3, or (2) initially constructed as shown in Figure 9.

Referring to Figure 4, gromets 17 integral with one of the facing layers, preferably the facing layer which is unperforated or plane, are employed as in Figure 3 and/or the outer peripheral edge 20 of the facing layer is turned up and bent over to form an overlapping integral edge portion or flange 21 similar to the overlapping edge 18 about the periphery of the gasket. This construction is illustrated in Figure 2 and provides for binding and sealing the exposed outer edge of the gasket as well as an additional clamping means for holding the layers of the gasket together. In some cases, only the internal gromets 17 are employed, while in other cases, the turned over edge or flange 20 of the metal facing alone is used. Also, if desired, the gaskets will have both the internal gromets 17, 18 and the external turned-over portions 20, 21. The turned-over edge portion 21 is compressed in the same manner as the edge portion 18 previously described and forms a substantially smooth gasket surface.

In Figures 5 and 6, instead of having the gromets 17, 18 and/or 20, 21 integral with one of the metal facings, i. e., drawn therefrom by a suitable metal forming or drawing process in accordance with certain openings desired in the gasket, separate gromet members 17', 18', as shown in Figure 11 are employed. These gromets are circular or barrel shaped, having a central opening defined by the body portion 17' and flange portions 18', one of the latter extending vertically as with the gromets 17, 18, and bendable and compressible in the same manner as the edge portion 18. Gromet members 17' are used to seal the exposed internal edges of the gasket openings and the integral overlapped portions 18' are compressed upon opposite sides of the metal facings in the manner heretofore described. Likewise, gromets 20' similar to that shown in Figure 2, are employed to seal the outer exposed edge of the gasket and provided with overlapped portions 21' compressed upon the facing layers in the manner already alluded to in connection with the integral gromets 20—21. As with the integral gromets, either the internal gromets 17' or the external gromets 20' or both are employed and serve to seal the exposed edges of the gasket as well as to clamp the gasket layers together into a firm and integral structure.

Referring to Figure 7, I superpose upon the perforate layer 15 of the gasket shown in Figures 3 to 6 a plane or unperforate layer 22 substantially coextensive with the metal facing layers and cushion gasket layer 14 or of slightly less area. Gromets 17, 18 or 17', 18', or gromets 20, 21 or 20', 21' or both are likewise utilized with this construction. The provision of a separate plane coextensive layer 22 is useful in some cases, but is not essential to the success of the gasket. Also, in some cases, the layer 22 is adhered to the facing 15 or otherwise united prior to application of the gromets.

In Figure 8, I have shown a construction similar to Figure 3, wherein the projections 16 are substantially in accordance with my United States Patent 1,927,450, the projections extending through the gasket material and having the ends clinched over to lie within the plane of the surface thereof. A facing barrier layer of this type is used in all of the gaskets illustrated as desired.

As will be appreciated upon referring to Figures 3 to 8 and Figure 9, a gasket is provided having metal facings between which is interposed a layer of cushion material. This cushion material is rendered resistant to the action of moisture, gases and temperature extremes and, moreover, is supported and sustained by the barrier members 16 which extend substantially across its thickness from one facing to the other. In the case of Figure 9, which construction may be embodied in any of the gaskets illustrated, as heretofore explained, when the gasket is compressed, the projections additionally penetrate the cushion layer so as to assume a position extending substantially across the gasket thickness as in Figures 3 to 8.

The gasket shown in Figure 10 is similar in all respects to those previously described, but in addition comprises two facing-barrier layers 14, 15, and the projections 16 are initially embedded either as shown in Figure 3 or in Figure 9.

The perforations 16' formed by striking up the barrier members 16 are thoroughly sealed, so that the gasket is entirely leak-proof and as heretofore stated the presence of this cushion material in the openings imparts resilience and flexibility to the product.

Of particular importance, the barrier members form an effective safeguard against blowing, but if a blow should take place, a continuing of the breach is effectively prevented, i. e., tearing is resisted. The projections 16 are formed in closely spaced relation substantially throughout the area of the gasket.

It will be understood, of course, that the facing layers 13 (15) and the cushion layer 14 are coextensive and that the gasket may have any suitable size or shape as desired.

The gromets, whether integral or separate and whether used to seal the internal exposed edges or the external exposed peripheral edge, additionally reinforce the gasket against blowing, as well as clamp the parts into a rigid unitary structure. While I have illustrated the gromets as being substantially continuous about the openings, it will be understood that they may partially comprehend the edge portions of the openings and peripheral edge of the gasket.

The gasket is flexible and resilient, but possesses the required rigidity for automotive purposes and, in fact, for any of the innumerable applications where a seal of optimum resistance is required.

*Method*

The preferred method of making the gasket of Figures 3 to 9 comprises striking up a plurality of closely spaced projections 16 from metal sheet material 15 and superposing thereon a layer or sheet of cushion material 14 and compressing the two together to form a laminated unit. In this unit, the projections will extend either to the surface and have their ends clinched over as shown in Figure 3 or be partially embedded in the cushion material as shown in Figure 9. The laminated metal cushion layer or sheet is now punched from the unit 14—15 to the configuration, for example shown in Figure 1. A layer of metal facing material 13 is similarly punched to the configuration shown in Figure 1 from a sheet and either prior to the punching step or subsequent thereto or in fact, simultaneous therewith, the integral gromet portions 17, 18, or 20, 21 or both defining openings corresponding to those in the unit 14, 15 are formed from the facing layer 13. The unit 14, 15 is now superposed upon the facing layer 13, the gromet portions 17 extending through the openings in the unit 14, 15, and thereafter the edge portions 18 of the gromets 17, 18 are compressed down upon the surface of the perforated metal facing layer 15.

This same procedure will be followed in manufacturing the gasket shown in Figures 4, 7, 8 and 9.

In the case of the gasket shown in Figure 7, the metal layer 22 is first preformed and then superposed upon the metal facing 15 and joined thereto if desired in any suitable manner, as by an adhesive, either before, simultaneous with or after the unit 14, 15 is superposed on the facing 13. The edge portion 18 of the gromet 17 or the edge portion 21 of the turned over portion 20 is then compressed down upon the layer 22 as previously described.

Where separate gromet members are employed as in Figures 5 and 6, the method previously described will be employed and the separate gromet members applied after the preformed layers have been built up as desired.

On the other hand, laminated sheets comprising layers of the structure of Figures 3–10, i. e., metal facing layers with interposed cushion material may be first produced and thereafter punched to have the contour of the gasket of Figure 1, for example, whereupon the separate gromet members are applied.

Referring to the structure of Figure 10, the facing barrier layers 15, 16 may be applied separately or simultaneously to the cushion layer 14 and form a laminated sheet which may then be punched to form the gasket or the layers may be given a preformed gasket shape and then united.

In some cases, it may be desired to initially unite the metal layer 13 to the cushion material for example in making laminated sheets which are to be subsequently punched, or in building up preformed layers to which separate gromets are applied. This may be accomplished by striking up a few projections in the metal facing 13 and embedding them in the cushion layer, or by uniting the cushion layer and facing 13 through the medium of a suitable adhesive. In the case of gasket of Figure 10, of course, no such uniting means need be employed. The cushion layer 14 is sometimes united to the facing layer 13 and thereafter the perforate facing barrier layer 15, 16 then applied, either where the layers are preformed or first formed in sheets from which the gaskets are punched. It is usually not necessary to unite the facing 13 to the cushion layer 14 where the gromets are integral with the facing layer 13 as in Figure 3, for example.

I have referred herein to the preliminary step of forming a metal cushion material layer 14, 15. However, in the case of the gasket of Figures 3 and 4, for example, the preformed layers, namely, the facing layers 13 and cushion layer 14 may be compressed together simultaneously with the compressing of edge 18 of the gromet upon the surface of the facing 15.

That is to say, the layers will be superposed and the projections 16 embedded in the cushion layer simultaneously with the operation of compressing and turning over the edge of the gromet to join the layers together. This procedure may likewise be resorted to in the case of the gaskets of Figures 5 and 6 and the other gaskets illustrated.

Various modifications in the product and method of manufacture may be made, all of which are comprehended within the scope of the appended claim.

This application is a continuation in part of my application Serial No. 1,062, filed January 9, 1935, now Patent No. 2,126,716, issued August 16, 1938.

I claim:

A gasket having an opening and consisting of a metal layer and a cushion layer, said metal layer forming one surface of the gasket and having a multiplicity of closely spaced openings and projections struck up from the metal layer at said openings, said projections embedded in the cushion layer and extending to the opposite surface thereof and having their ends clenched over on said surface, a plane metal layer having an uninterrupted face and forming the opposite surface of the gasket, means connecting all of the layers together with the clenched-over ends of the projections engaging the inner surface of the plane layer whereby heat transfer through the gasket is facilitated.

GEORGE T. BALFE.